Patented Apr. 20, 1954

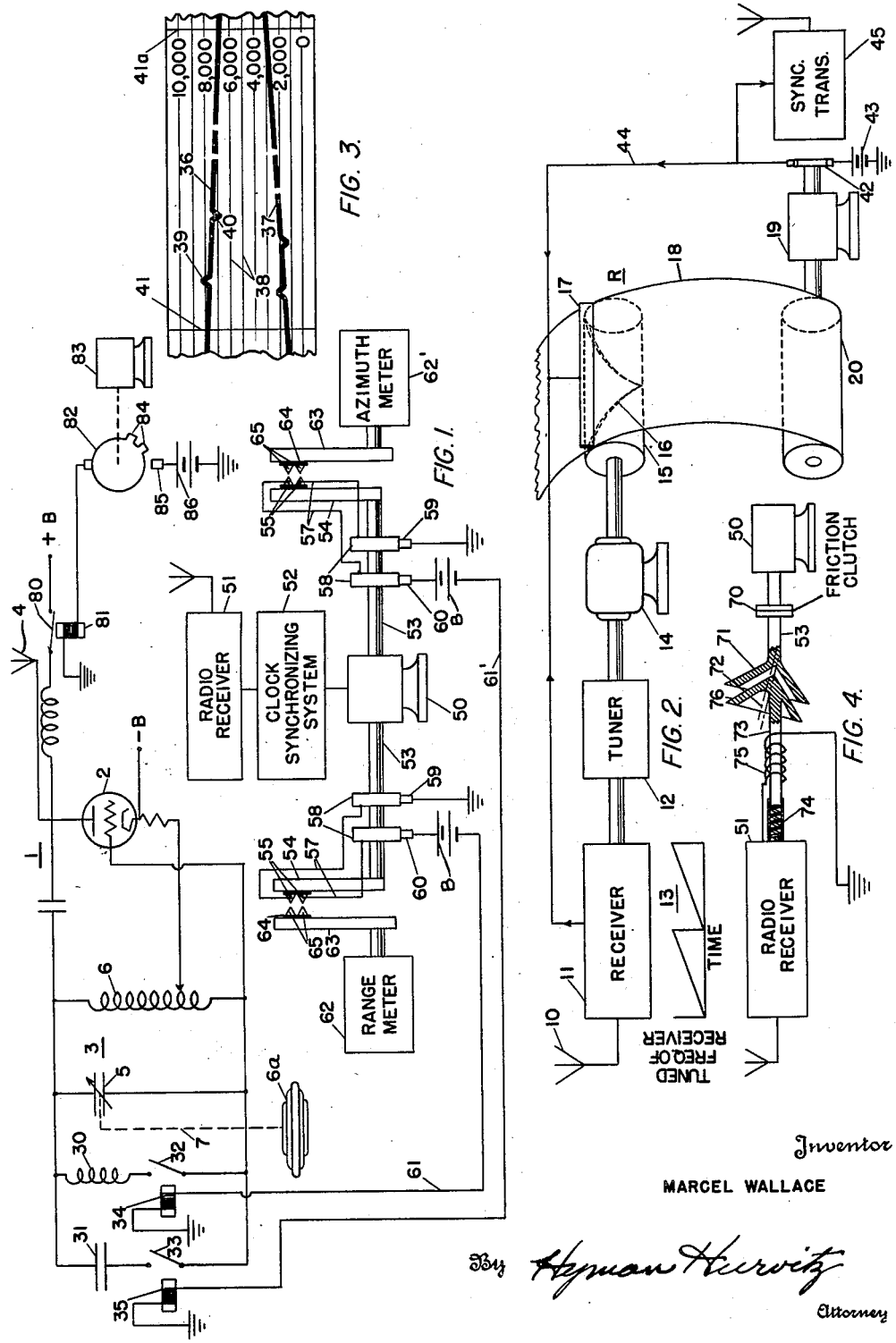

2,676,314

UNITED STATES PATENT OFFICE 2,676,314

FREQUENCY AND PULSE TIME MODULATION TELEMETRIC SYSTEM

Marcel Wallace, East Port Chester, Conn., assignor, by mesne assignments, of one-half to said Wallace, doing business as Panoramic Laboratories, East Port Chester, Conn.

Application June 16, 1947, Serial No. 754,940

18 Claims. (Cl. 340—182)

The present application is a continuation-in-part of my application for U. S. Patent, Serial Number 729,387, filed February 18, 1947, now Patent No. 2,565,008.

This invention relates generally to telemetric devices and particularly to telemetric devices operating to transmit and record the values of a plurality of measurable quantities from each of one or more measuring and transmitting locations.

In the application for U. S. patent previously referred to values of a single quantity are transmitted from each of a plurality of locations, values being expressed or translated in terms of transmitted frequencies. A line scanning recorder is provided which operates in synchronism with a frequency scanning receiver, the latter providing a record creating signal to the recorder in response to each frequency encountered in the course of each frequency scanning operation of the receiver, and the recorder operating to make a mark on a time fed record receiving surface at lateral positions thereof which bear definite correspondences with the frequency positions of the received signals.

In the present application the fact that the record receiving surface is time fed, and therefore may be time calibrated, is taken advantage of to impose on the frequency representative records further markings, in terms of modulations of the frequency representative records, and occurring at times determined by the values of measurable quantities. Each frequency representative record, which extends in a generally longitudinal direction along the record receiving surface, and which represents by its instantaneous lateral position on the surface the value of one measurable quantity, may be supplemented by one or more lateral pips, which are representative in terms of their longitudinal positions along the frequency representative record, with respect to an arbitrarily determined starting position, of the values of still further measurable quantities.

It is, accordingly, an object of the present invention to provide a telemetric system utilizing both frequency deviation and pulse time position techniques for transmitting telemetric information.

It is a further object of the invention to provide a telemetric recording system for recording on a time fed record receiving surface, wherein both lateral and longitudinal recorded indications are utilized in recording telemetric information.

It is still a further object of the present invention to provide a telemetric recording system wherein one of a plurality of measurable quantities is transmitted in terms of frequency deviations of a carrier, and wherein further ones of said plurality of measurable quantities are transmitted in terms of timed transient modulations of said carrier.

It is another object of the present invention to provide a telemetric system for recording telemetric values in terms of timed modulations of a recorded line, the position of which itself provides a time record of values of a measured quantity.

It is, more broadly considered, an object of the invention to provide a telemetric system for recording the values of a plurality of quantities by means of a single record trace.

Specifically considered, it is an object of the invention to provide a system for transmitting from each of one or more locations sets of signals representative of the values of three quantities, one of each set of quantities being transmitted in terms of a frequency value and the remaining quantities in terms of timed deviations from that frequency, and for continuously recording the values of frequency, and of the times of occurrence of the deviations of frequency, on a single record receiving surface.

The above and still further objects and advantages of the present invention will become more apparent upon study and consideration of the following detailed description of one specific embodiment thereof, especially when taken in conjunction with the accompanying drawings, wherein:

Figure 1 is a circuit, largely in block diagram, of one embodiment of the invention, and wherein certain structural details are illustrated in simplified form;

Figure 2 is a circuit diagram of a recording station, in accordance with the invention, certain structural features being illustrated in simplified and conventionalized form;

Figure 3 is a presentation of a record receiving surface, in plan view, indicating the character of the records provided by the system; and Figure 4 is a schematic showing of a synchronizing system utilized for synchronizing a plurality of clocks or drive motors, in the present system.

Referring to Figure 1 of the drawings, the reference numeral 1 denotes an electronic oscillator comprising a triode 2 or the like, and an associated tuned circuit 3, which together generate high frequency oscillations in a manner which is, per se, well known. The energy generated is applied to an antenna 4, for transmission, and the frequency of transmission is determined primarily by the values of inductance and capacitance inherent in the condenser 5 and the coil 6, respectively, of the tuned circuit 3. The capacitance of condenser 5 is made variable, and subject to control by an aneroid cell 6a, over a mechanical linkage indicated conventionally by the dotted line 7. The cell 6a serves to vary the capacity of condenser 5 in accordance with altitude, and by virtue of that fact, transmission from the oscillator 1 is representative of altitude in terms of transmitted frequency.

Reference is now made to Figure 2 of the drawings, which represents a signal receiver, translator and recorder, in accordance with the invention. The reference numeral 10 denotes an antenna which is operatively associated with a panoramic or frequency scanning receiver 11, having a mechanically driven periodic tuner 12, which causes the tuning of the receiver 11 to vary continuously, and in linear fashion with respect to time, as indicated by the graph 13, the band of frequencies scanned comprising the spectrum of frequencies assigned to a plurality of equipments of the type illustrated in Figure 1, for transmissions of altitude representative signals. Reference is made to U. S. Patent No. 2,279,151, issued to M. Wallace, for further details of frequency scanning radio receivers.

The tuner 12 is continuously operated by a motor 14, at any convenient speed, say 5 or 10 R. P. S., the motor 14 also serving to rotate at like speed a cylinder 15, having thereon a helical ridge 16 comprised of a single turn about the cylinder 15. The helical ridge 16 will be hereinafter referred to as a helical platen or as a space scanning platen, since its function is to provide a continuously moving or scanning point of intersection with the linear marking member 17, as the cylinder 15 rotates. Intermediate the helical platen 16 and the linear marking member 17 is provided a record receiving surface 18, which is time fed past the marking element 17, by means of a clock 19, and onto a take-up roll 20. The cylinder 15, the platen 16, the linear marker 17, the record receiver 18, the take-up roll 20 and the paper feed motor 19 together provide a recorder R of the type which is per se well known in the field of facsimile reception, and further details concerning various forms of which are available in the patented literature. I prefer to utilize a recorder of the specific character described and illustrated in U. S. Patent No. 2,215,806, issued to Young, and dated September 24, 1940. Nevertheless, I do not intend to be limited to use of the specific recorder disclosed in Patent No. 2,215,806, other forms of recorder for the same purpose being well known and readily available, so that utilization of any specific facsimile type recorder involves a mere matter of choice. Suffice it to state, for purposes of the present disclosure, that upon application to the marker element 17 of voltage of sufficient magnitude, a record will be made on the receiving surface 18, at the then point of intersection of helical platen 16 and marker element 17. By proper relative phasing of the operation of the tuner 12 and of the angle of rotation of the cylinder 15, the recording point of the recorder may be caused to scan laterally across the record receiving surface 18 in precise synchronism with the tuning of the receiver 11, and for each frequency to which the receiver 11 may be tuned, will correspond a lateral position of the point of intersection of platen 16 and marker 17, and the surface 18 may be correspondingly calibrated.

The existence and frequency values of signals within the frequency band scanned by the receiver 11 therefore will be indicated by recordings on the surface 18, and since in the presently preferred application of the present system, equipments of the character of that illustrated in Figure 1 of the drawings may be located in various aircraft, which may fly at various altitudes, and each provides a substantially continuous transmission of radiant energy at a frequency representative of its altitude, for reception by the receiver 11, the recorder R will provide a continuous record of altitude versus time for the various aircraft.

Referring now again to Figure 1 of the drawings, an inductance 30 is provided potentially in parallel with coil 6 and a trimmer condenser 31 potentially in parallel with condenser 5, of the tuned or frequency determining circuit 3 of oscillator 1.

Insertion of coil 30 or of condenser 31 into circuit 3 is controlled by a pair of relay operated switches 32 and 33, respectively, which are normally open, and which are operated in circuit closing relation upon application to the relays 34, 35 respectively of adequate D. C. operating potential.

Upon connection of coil 30 in parallel with coil 6, the total inductance of the circuit 3 is decreased, and the relative values of inductances 6 and 30 being selected to render this decrease relatively small, a corresponding small increase of transmitted frequency occurs. Alternatively, inclusion of condenser 31 in tuned circuit 3 results in a small increase of capacity, with a consequent decrease of frequency. If we assume that the inclusions of condenser 31 and of coil 30, in circuit 3, are of temporary character, occurring for short times only, it will be evident, upon consideration of the structure and mode of operation of the recording device illustrated in Figure 2 of the drawings, that corresponding slight deviations of altitude representative lines may be caused to occur in the record provided by recorder R. Referring to Figure 3, wherein is illustrated in plan view, a longitudinally extending portion of the record receiving surface 18, there is shown a pair of altitude representative lines 36 and 37, which may be interpreted by comparison with altitude calibration lines 38, to provide a time record of altitudes of a pair of aircraft. Laterally extending pips 39 and 40, are shown to illustrate responses respectively, of the recorder R to transient inclusion of coil 30 and condenser 31 into the circuit 3, pip 39 representing a transient increase in transmitted frequency and pip 40 a transient decrease in transmitted frequency. It is intended that the timing of pips 39 and 40, respectively, as represented by their longitudinal positions, on surface 38, with respect to an arbitrary starting or reference line 41, shall represent the values of measurable quantities, which in the presently preferred embodiment and application of the invention, may correspond with the range and azimuth of the transmitter with respect to a ground located beacon system (not shown).

An initial or zero reference line, or starting position, 41 may be impressed on the surface 18 by applying to the marker element 17 at definite spaced intervals a recording potential, of duration equal to one or several scanning cycles of helical platen 15. To accomplish this the clock or drive motor 19 for the take-up roll 20 is utilized to drive a cam 42, which operates to close a circuit from potential source 43, over lead 44, to marker 17, at equally timed intervals, and hence at equal spaced intervals longitudinally of the surface 18. The cam 42 may be driven quite slowly from the clock 19, say at one revolution in each 30 seconds, which may correspond with three inches of paper feed in presently conventional facsimile type recorders. I may obviously utilize basic time intervals which are shorter or longer than the selected 30 second intervals, the latter being, however, one convenient value. The voltage impulses available on lead 44 may be further utilized to key on a radio transmitter, which operates at an allocated frequency outside the altitude representative band of frequencies, and transmissions from which are utilized as synchronizing pulses at the various aircraft of the system.

Returning now to the airborne equipment of Figure 1 of the drawings, there is provided a clock 50, adjusted to operate at the same speed as does the clock 19, as nearly as may be. The clocks 19 and 50 may comprise synchronous motors operated at identical frequencies, available from a common source of such signals, such as an omni-directional beacon. Alternatively, the clocks 19 and 50 may be spring motors, adjusted to operate at substantially identical speed; again, the clocks may comprise electric motor drives which are not synchronized but which are designed to operate at practically identical speed. It may be assumed that, even in the absence of synchronization of rates of rotation of clocks 19 and 50, the total departure in time between various clocks of the system in a period of 30 seconds may be made negligible, since spring driven clocks which lose or gain less than one minute of time per day are now quite common commercially. Cumulative departures in measured time between clock 19 and clock 50 may, however, be quite serious, and it is for that reason that I have provided for synchronization at definite intervals, and in the present disclosure at 30 second intervals. The sync pulses emitted by the transmitter 45 are received aboard each of the aircraft of the system by means of a receiver 51, and applied via a clock synchronization system 52, the details of which will be hereinafter explained, to reset the clock 50, at the end of each 30 second interval, to exact synchronism with the clock 19. Should a clock 50 cease to operate temporarily and be restarted at an arbitrary time, loss of synchronization would subsist for a relatively short time, after which the clock would be reset, and as will appear hereinafter, inaccuracy of transmitted information will likewise be of temporary character.

Assuming for the present that the clocks 19 and 50 are relatively synchronized and framed, and considering Figure 1 of the drawings, the clock 50 drives a pair of shafts 53, to each of which is secured a radial arm 54. Secured to one of the arms 54, in electrically, insulated relation thereto, is a pair of sharp metallic projections 55, the projections of each pair being connected electrically by means of leads 57, with slip rings 58, mounted on the shafts 53. One of the rings is grounded over a brush 59, the remaining ring being connected over a brush 60 in series with a source of voltage B, and over a lead 61 to relay 34. A meter 62, which comprises part of a distance measuring equipment (not shown) positions a pointer 63, in accordance with range measurements taken with respect to the beacon system, hereinbefore referred to. Secured to the pointer 63 is a small strip of insulating material 64, to which is secured a pair of sharp projections 65. The projections 55 and the projections 65 are arranged to be in radial alignment, when the arm 63 and the arm 54 are in angular alignment, but to be just barely out of contact. The potential of source B is sufficiently high to assure that when projections 64 and 65 are precisely in alignment a spark will pass between the upper projections and between the lower projections, completing the circuit to the relay 34.

From the above description it will be clear that as the arm 54 rotates, at a rate of one revolution in each thirty seconds, the relay 34 will be operated once in each cycle of rotation, and at a time determined by the angular position of pointer 63, which corresponds with a range reading of instrument 62.

Since the record receiving surface has been feeding in synchronism with the progress of arm 54, and keeping in view the fact that energization of relay 34 causes a temporary shift in emitted frequency, it will be clear that a slight jog in the altitude record of transmitter 1 will be produced at a longitudinal position along the record receiving surface 18 which corresponds with measured range. If line 36 in Figure 3 corresponds with the time record of altitude of transmitter 1 the mark 39 is made at a distance from initial line 41 corresponding with the range of transmitter 1 with respect to the referred to beacon or transponder (not shown). Since the longitudinal distance between initial line 41 and a succeeding such line 41a corresponds with the known maximum range of which meter 62 is susceptible, a simple measurement of distance is sufficient to determine the significance of pip 39, in terms of range.

The mechanism for actuating relay 35, for producing a pip 40 (Figure 3) is precisely similar in all respects to that hereinbefore described in connection with the description of the production of pip 39, except in that measurements are provided by means of an azimuth reading meter 62', which may derive its indications from an instrument (not shown) for determining bearings from transmission provided by an omnidirectional beacon of the general type now approved by the Civil Aeronautics Authority, or in any other preferred manner. The meter 62, and its associated apparatus provides energizing signals to relay 35 over lead 61', at times representative of measured azimuths, and closures of relay 35 ultimately provide pips 40 on altitude representative record 36, which are oppositely directed, and hence readily distinguishable, from the pips 39.

In Figure 1 of the drawings the block labelled 52 may represent any synchronizing or clock setting system available in the art, and many such systems are available, one example of which is disclosed in U. S. Patent No. 2,005,158, issued to Nicolson, June 18, 1935. I prefer to use the simplified synchronizing system illustrated in Figure 4 of the accompanying drawings, which is particularly adaptable to use in the telemetric system of the present invention.

The clock or motor 50 drives a shaft 53 on which is mounted the arm 54 (see Figure 1) via a friction or slip clutch 70. To the shaft 53 is secured a hollow right circular cone 71, the axis 72 of which is not in alignment with the shaft 53 but departs from alignment by an angle of perhaps 15°. A further shaft 73 is provided which is in alignment with shaft 53, and which is movable along its axis, to the right as seen in the drawings, against the tension of a spring 74, and in response to energization of relay 75, but which is not rotatable. The solenoid 75 is energized in response to pulses derived from the sync signal receiver 51. The shaft 73 is provided with a right circular cone 76, rigidly mounted with its axis 77 making the same angle with respect to shaft 73 as axis 72 makes with respect to shaft 53. The cones 71 and 76 are therefore adapted to mesh completely in only one relative angular position thereof, and the outer surface of cone 76 and the inner surface of cone 71 are made sufficiently smooth so that if in response to actuation by solenoid 75 the cone 76 is driven internally of cone 71 and into contact therewith, while the cones 71 and 76 are not in the said one angular position a camming action occurs, the clutch 70 slipping, which rotates cone 71 until it is in complete mesh with cone 76.

The cones 71 and 76 are aligned relatively to each other, and to the position of the arm 54, so that in position of complete mesh the arm 54 is in proper angular relation for initiation of a cycle of scan of the locus of possible positions of meter pointer 63.

In normal operation only a very slight camming action is required in response to each zero-setting or framing action of the apparatus, since clock 50 may be depended on to have but very slight angular drift in the time required for a single revolution of shaft 53. Upon initiating operation of an airborne equipment, however, the shaft 53 may be at random position, and a considerable camming action may be required. Since the camming action endures only during reception of sync pulses, there may be insufficient time to accomplish complete framing in a single operation. This in itself is not serious, since framing may take place in a plurality of steps, without detriment except to the accuracy of the first few telemetric transmissions.

The apparatus as described hereinbefore requires one additional desirable element, that is, a means of identifying each aircraft of the system with a particular record. To accomplish this I place in series with the B+ lead to the triode 2 of oscillator 1 a circuit maker and breaker 80, which is normally closed, but which may be opened in response to energization of electro-magnet 81. The latter action occurs in response to circuit closing action of a cam 82, which is driven continuously at a slow rate by clock 83, and which has on its circumference raised elements 84, arranged in coded sequence peculiar to each individual aircraft. Upon passage of a raised element 84 under brush 85 a circuit is completed for magnet 81 from potential source 86, causing the magnet 81 to open the switch 80 and to interrupt transmissions from the aircraft. The code wheel 82 is arranged to cause coded interruptions of transmission at relatively rare intervals, say once every 3 minutes, since the coding process may result in loss of azimuth or range information, and to minimize the latter possibility the coded interruptions are arranged to be of very short duration relative to the fundamental recording period of thirty seconds.

It will be clear that the methods which I have applied for modulating the altitude representative records 36, 67, involve largely a matter of choice, and that likewise that interrupting of transmissions for providing identification, involves a matter of choice. As example of other expedients which might be adopted, I suggest that coil 30 or condenser 31 may be connected in circuit by electro-magnet 81, so that identification markings may be provided in terms of variations of frequency in one sense or the other, instead of by interruptions of transmission. I suggest further that range and azimuth transmissions may be distinguished in terms of size of pip provided to represent each, rather than in terms of direction of pipe. The latter may be simply accomplished by substituting for coil 30 a condenser of different capacity than condenser 31, which will provide a measurably different deviation frequency than is provided by the condenser 31, when connected in the oscillatory circuit 3.

The invention, further, may be applied to uses other than telemetric recording of altitude, range and bearing, by replacing the aneroid cell 6, and the specific meters 62 and 62', or any one of them, with devices for measuring other quantities than altitude, range and bearing, respectively.

It will be further realized that by multiplying the above expedients, a large number of independent values may be transmitted as timed modulations of a carrier and recorded in accordance with the invention. If it were desired to record six quantities in terms of longitudinal modulations of a recorded line, three of the quantities might be assigned to one sense of frequency deviation and three to another, and each quantity might be assigned a specific value of frequency deviation, or even a specific duration of a specific value of frequency deviation, to provide distinguishable markings on the record strip.

Accordingly, while I have described and illustrated one specic embodiment of my invention, as required by the pertinent statutes relating to patents of the United States, it will be clear to persons skilled in the telemetric arts that various uses may be found for the invention, and that various modifications of the general arrangement disclosed, as well as of various details thereof, may be resorted to without departing from the true spirit and scope of the invention, as defined in the appended claims.

What I claim and desire to secure by Letters Patent of the United States is:

1. A telemetric system comprising a transmitter for transmitting a carrier, means for determining a frequency of said carrier in accordance with values of a first measurable quantity, and means for providing frequency deviations of said carrier at times representative of the value of a second measurable quantity.

2. A telemetric system in accordance with claim 1 and further comprising a recorder having periodic line scanning marking means and a time fed record receiving surface, means for scanning periodically a range of frequencies including said frequency and for providing a record producing signal in response to received signals, means for synchronizing the scanning action of said means for scanning and of said line scanning marking means, means for applying said signals to said line scanning marking means, and means to provide a mark at locations on said surface corresponding with frequencies of received signals.

3. In combination, means for transmitting a plurality of transient relatively distinguishable signals each at a time representative of the value of a measurable quantity, a time fed record receiving surface, and means for recording each of said signals in relatively distinguishable fashion as modulations of a recorded line running substantially in the direction of time feed of said time fed recording surface.

4. In combination, a record receiving strip, means for longitudinally feeding said strip at a predetermined rate, means for transmitting a carrier, means for modulating said carrier at times representative of the values of a plurality of measured quantities and in manners peculiar to each of said quantities, means for receiving and translating said carrier and for recording on said record strip the occurrence and the peculiarity of each of said modulations at points longitudinally of said strip corresponding with said times of modulation.

5. In combination, an oscillator having tuning means, means for controlling said tuning means in accordance with the value of a first measurable quantity, means for transmitting signals at a frequency determined by the tuning of said oscillator, means for varying the tuning of said oscillator, a meter having an angularly positionable pointer, means for scanning a range of positions of said pointer for discovery of the position of said pointer, and means included in said scanning means and responsive to said discovery of the position of said pointer for actuating said means for varying.

6. The combination in accordance with claim 5 and further comprising a recorder having a line scanning marker and a longitudinally time fed record receiving strip, means for synchronizing the time feed of said strip with the scanning action of said means for scanning a range of positions, and means responsive to said transmitted signals for periodically actuating said marker at positions laterally of said record receiving strip corresponding with the tuning of said oscillator.

7. A telemetric system comprising means for transmitting a carrier wave, means for determining the frequency of said carrier wave in accordance with the value of a first measurable quantity, and means for varying the frequency of said carrier distinguishably at times determined respectively in accordance with the values of each of a pair of measurable quantities.

8. A telemetric system comprising means for transmitting a carrier wave, means for determining the frequency of said carrier wave in accordance with the value of a first measurable quantity, means for varying the frequency of said carrier wave transiently in one sense at times determined in accordance with the value of a second measurable quantity, and means for varying the frequency of said carrier wave transiently in another sense at times determined in accordance with the value of a third measurable quantity.

9. A telemetric system comprising means for transmitting signals having a predetermined frequency, means for establishing repetitive time intervals, means for generating pairs of further signals, each signal of each pair having a time position with respect to one of said time intervals determined in accordance with the value of a measurable quantity, and means for frequency modulating said means for transmitting signals distinguishably in response to each of said further signals.

10. A telemetric system comprising means for transmitting signals, means for establishing repetitive time intervals, means for generating repetitive pairs of further signals each signal of each pair having a time position within one of said repetitive time intervals determined in accordance with the value of a different measurable quantity, and means responsive to each of said further signals for distinguishably and transiently modulating said means for transmitting signals.

11. A telemetric system comprising means at each of a plurality of separated locations for transmitting signals, a synchronizing transmitter for transmitting synchronizing signals to each of said locations, means at each of said locations for measuring the value of a measurable quantity, means responsive to said synchronizing signals at each of said locations for establishing repetitive synchronized time intervals at each of said locations, means responsive to said means for measuring at each of said locations for generating repetitive further signals having time positions in said time intervals determined by the value of said measurable quantity, means responsive to said repetitive further signals at each of said locations for determining transmission times of signals transmitted by said first mentioned means at each of said locations, and a common visual indicator for receiving and recording in juxtaposition the time positions of said transmitted signals with respect to a time axis determined by reference to said synchronizing signals.

12. A telemetric system comprising a first transmitter for transmitting signals, a second transmitter for transmitting signals, means for establishing common repetitive time intervals for said first and second transmitters, means for generating repetitive pairs of further signals at each of said transmitters, each signal of each pair at either of said transmitters having a time position within one of said repetitive time intervals determined in accordance with the value of a different measurable quantity, means responsive to said further signals at each of said transmitters for distinguishably modulating said transmitters, and a visual indicator for commonly and distinguishably indicating the time positions of signals transmitted by said transmitters.

13. A telemetric system comprising a first transmitter for transmitting a carrier at a first predetermined frequency, a second transmitter for transmitting a further carrier at a further predetermined frequency, means at said first transmitter for modulating said first carrier at intervals timed in accordance with the value of a first measurable quantity, means at said second transmitter for modulating said second carrier at intervals timed in accordance with the value of a second measurable quantity, said means at said first transmitter and said means at said second transmitter comprising apparatus for varying the said predetermined frequencies, and means for establishing a predetermined relation between said intervals at said first and second transmitters.

14. In a telemetering system having a receiving station for producing a record of the frequency of a received signal wave: a transmitting station having an oscillator for generating a signal wave; means for modulating the frequency of said oscillator in accordance with a first reading that is continuous and variable; means for shifting the frequency of said oscillator an arbitrary amount in one direction in accordance with a second reading that is discontinuous and has only one value; means for shifting the frequency of said oscillator an arbitrary amount in the other direction in accordance with a third reading that is discontinuous and has only one value; and means for transmitting the signal wave.

15. In a telemetering system having a receiving station for producing a record of the frequency of a received signal wave: a transmitting station having an oscillator for generating a signal wave; means for modulating the frequency of said oscillator in accordance with a first reading that is continuous and variable; means for shifting the frequency of said oscillator an arbitrary amount in one direction in accordance with a second reading that is discontinuous and has only one value; and means for transmitting the signal wave.

16. A telemetric system comprising means for transmitting a carrier having a frequency characteristic representative of the value of a first measurable quantity and means for further modulating said carrier at intervals representative of a second measurable quantity, a remote recording means comprising means for interpreting and providing a record of the value of said first measurable quantity, said recorder being adapted and arranged for modulating said record in accordance with the value of said second measurable quantity.

17. In combination, a transmitter, means for tuning said transmitter, means for controlling said tuning in accordance with the altitude of an elevated object, means for modulating said transmitter with modulating signal at predetermined discrete times in a time cycle, and means for determining said predetermined discrete times in accordance with the value of a measurable quantity, a recorder having marking means and a longitudinally time fed record receiving strip, means responsive to said transmitter for actuating said marking means for creating marks laterally of said strip at positions representative of altitude and for actuating said marking means in response to said modulating signal for modulating said marks at points longitudinally of said strip which are representative of the value of said measurable quantity.

18. A telemetric system comprising a transmitter for transmitting a carrier at a predetermined frequency, and means for modulating said carrier at intervals timed in accordance with the value of a measurable quantity, said last named means comprising apparatus for varying the said frequency, a recorder having a line scanning marking means and a time fed record receiving surface, means for actuating said recorder to provide substantially continuous marks on said surface at lateral locations representative of said predetermined frequency, and for providing modulations of said marks at longitudinal locations representative of the value of said measurable quantity.

References Cited in the file of this patent

UNITED STATES PATENTS

| Number | Name | Date |
|---|---|---|
| 1,983,079 | Hansen | Dec. 4, 1934 |
| 2,081,413 | Thompson | May 25, 1937 |
| 2,081,684 | Stoddard | May 25, 1937 |
| 2,202,452 | Hildabrand | May 28, 1940 |
| 2,252,083 | Luck | Aug. 12, 1941 |
| 2,363,941 | Busignies | Nov. 28, 1944 |
| 2,367,907 | Wallace | Jan. 23, 1945 |
| 2,378,604 | Wallace | June 19, 1945 |
| 2,380,520 | Hassler | July 31, 1945 |
| 2,403,603 | Korn | July 9, 1946 |
| 2,407,336 | Young | Sept. 10, 1946 |
| 2,419,292 | Shepard | Apr. 22, 1947 |
| 2,422,295 | Eaton | June 17, 1947 |
| 2,430,307 | Smith | Nov. 4, 1947 |
| 2,453,773 | Young | Nov. 16, 1948 |
| 2,466,804 | Giffen et al. | Apr. 12, 1949 |
| 2,505,314 | Wallace et al. | Apr. 25, 1950 |

OTHER REFERENCES

Fidelman: Electronic Applications in Meteorology. Radio News, Engineering Dept., May 1946, pp. 36–38.